United States Patent Office 2,925,018
Patented Feb. 16, 1960

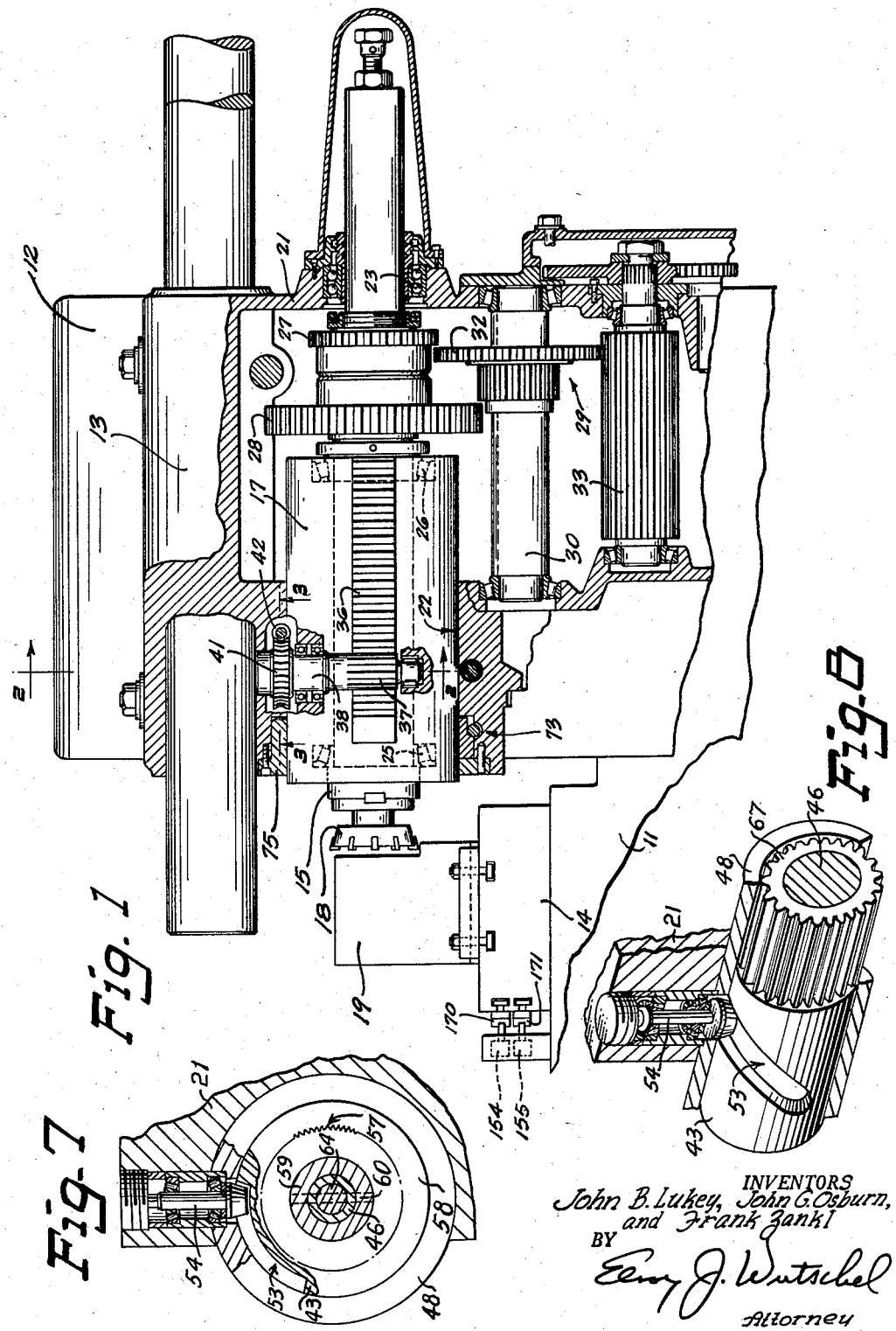

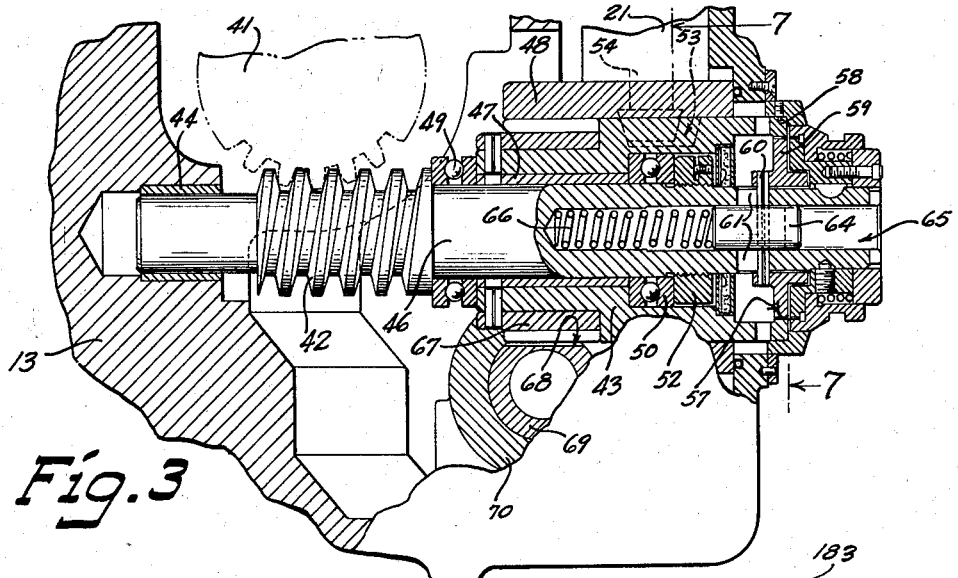

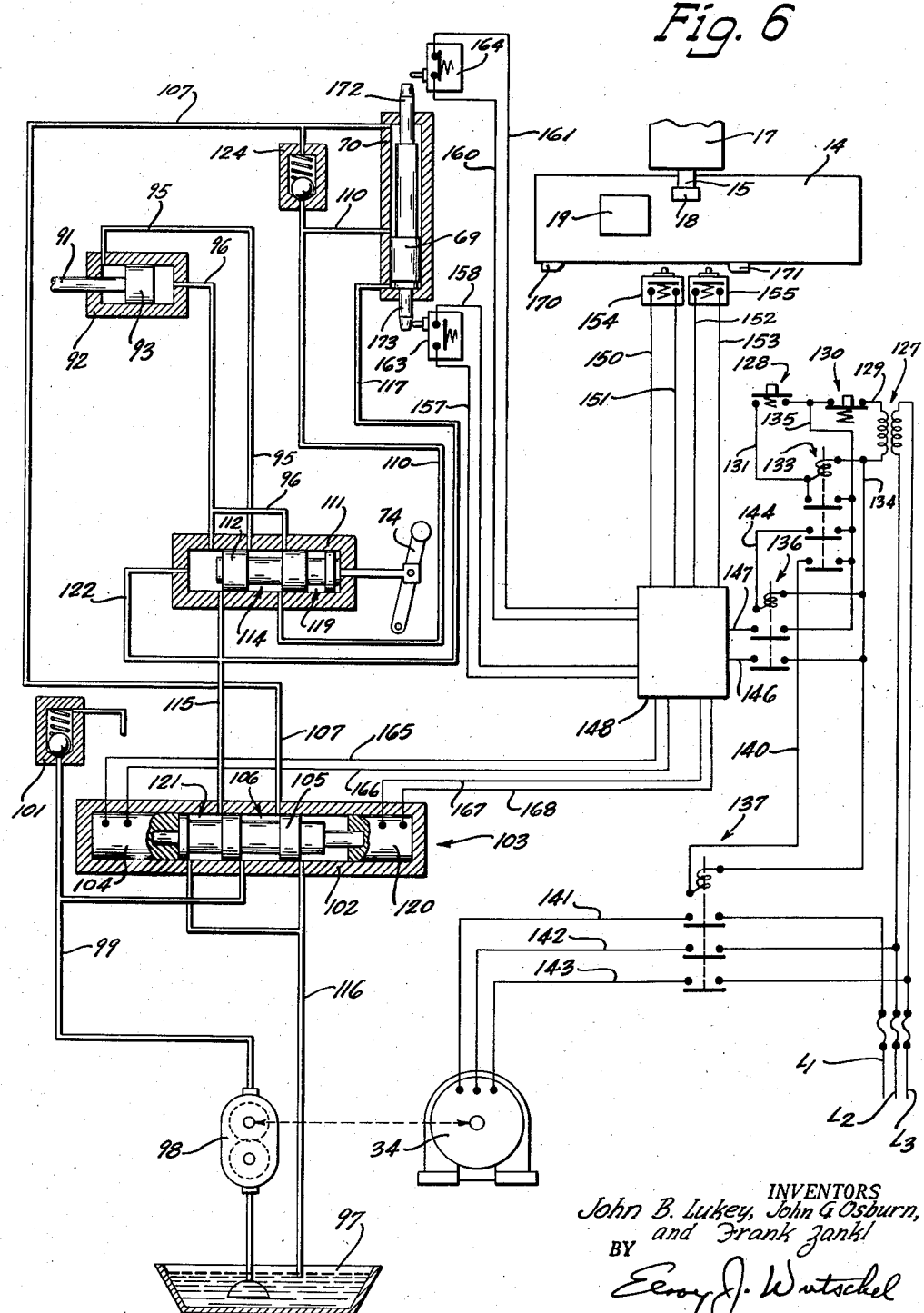

2,925,018

QUILL RETRACTING AND POSITIONING MECHANISM

John B. Lukey, West Allis, John G. Osburn, and Frank Zankl, Milwaukee, Wis., assignors to Kearney & Trecker Corporation, West Allis, Wis., a corporation of Wisconsin Application December 24, 1956, Serial No. 630,179

9 Claims. (Cl. 90—16)

This invention relates generally to improvements in machine tools, and more particularly, to a quill retracting and positioning mechanism for the axially movable spindle quill of a machine tool.

In certain types of machining operations, it is customary to return a workpiece and a cutter to their respective relative starting positions after the machining operation has been completed. In a milling machine for example, relative movement at feed rate is effected between a workpiece and a rotating cutter with the cutter engaging the workpiece to remove metal during the machining operation. At the completion of the cutting stroke, relative movement between the workpiece and the rotating cutter is reversed, usually at rapid traverse rate, to return each member to its respective starting position. During return movement, the removal of actual cutting stresses may cause the rotating cutter to engage the workpiece sufficiently to damage the already finished surface. To prevent damaging the finished surface of the workpiece, it is desirable to provide for a slight relative retracting movement between the workpiece and the cutter at the completion of the milling operation. Thus, actual engagement between the cutting tool and the finished surface of the workpiece is prevented during return movement to the starting positions.

A general object of this invention is to provide an improved mechanism for effecting retracting movement of a spindle quill.

Another object of the invention is to provide an improved mounting structure for the spindle quill of a machine tool.

Another object is to provide improved adjustable control means for effecting axial positioning movement of a spindle quill.

Another object of the invention is to provide improved means for effecting automatic retraction of a spindle quill as well as automatic return movement of the quill relative to a predetermined position.

Another object is to provide an improved spindle quill adjustment mechanism, in combination with quill moving and quill clamping mechanism.

Another object is to provide an improved clamping mechanism for the axially movable spindle quill of a machine tool.

Another object is to provide an improved hydraulically actuated control mechanism for clamping or unclamping the axially movable spindle quill of a machine tool.

A further object is to provide an improved combined positioning and retracting mechanism for a machine tool spindle quill that is carried for axial movement.

A further object is to provide an improved hydraulically actuated clamping and retracting mechanism for an axially movable spindle quill together with adjustment means for adjusting the extent of retracting movement.

A still further object is to provide an improved mechanism for effecting retracting or return axial positioning movement of a spindle quill in coordinated relationship with work feeding and return movement of a worktable.

According to this invention, a machine tool is provided with a tool spindle that is carried for manually effected axial movement to a predetermined preset position, automatic retracting movement relative to its preset position, and automatic return movement to its preset position, in combination with means for clamping the quill in its preset position. The tool spindle is journalled in a quill mounted for axially slidable movement in a spindle head. A longitudinally extending rack secured to the quill is engaged by a pinion secured to a rotatable shaft journalled in the head and having a worm wheel affixed thereto. The worm wheel is in turn engaged by a worm that is carried for both rotatable and axially slidable movement. Toward one end, the worm extends through and is rotatably journalled within a concentrically positioned sleeve, that in turn, is journalled for rotatable and axial slidable movement within the spindle head. For moving the spindle quill to a predetermined axially adjusted position, the worm is rotated relative to the supporting sleeve and secured thereto by means of a releasable locking device. On its outer periphery, the sleeve is provided with a gear segment and a spaced apart helical cam groove, the groove being engaged by a stationary guide pin secured within the spindle head. A transversely mounted piston, carrying rack teeth engaging the sleeve gear segment, is slidably carried within a supporting hydraulic cylinder having inlet ports formed toward its opposite ends. To move the piston to one extreme position for retracting the quill from its manually selected preset position, a hydraulic control system is adapted to selectively admit hydraulic fluid under pressure into one end of the cylinder. Admission of fluid into the opposite end of the cylinder moves the piston in the opposite direction for returning the quill to its manually selected preset position. A releasable clamp mechanism is connected to automatically clamp the quill against axial movement whenever it is in its outward manually selected preset position, and is operative in coordinated relationship with the quill moving piston.

The foregoing and other objects of the invention, which will become more fully apparent from the following detailed description, may be achieved by means of the particular structure constituting an exemplifying embodiment of the invention that is shown in and described in connection with the accompanying drawings in which:

Figure 1 is an enlarged fragmentary view, partly in side elevation and partly in transverse vertical section, of a machine tool incorporating a preferred embodiment of the invention;

Fig. 2 is an enlarged fragmentary view in vertical section through the spindle head taken generally along the lines 3—3 in Fig. 1;

Fig. 3 is an enlarged fragmentary view in horizontal section through the spindle head taken generally along the lines 3—3 in Fig. 1;

Fig. 4 is a fragmentary view in transverse vertical section through a portion of the quill clamp actuating mechanism, taken along the line 4—4 in Fig. 2;

Fig. 5 is a fragmentary view in vertical section showing a modified form of a quill retracting piston;

Fig. 6 is a schematic electro-hydraulic diagram showing a control system for effecting coordinated clamping and axial retracting movement of the spindle quill;

Fig. 7 is a fragmentary view in vertical section along line 7—7 in Fig. 3; and

Fig. 8 is a fragmentary view in perspective of the cam groove in the worm shaft sleeve and the stationary pin engaged therein for axial movement of the sleeve upon rotation thereof.

Referring to the drawings and more particularly to Fig. 1, the machine there shown comprises essentially a supporting frame or bed 11, an upstanding column 12, and a spindle head 13 slidably mounted on the column for selective vertical adjustment. A worktable 14 slidably carried by the frame 11 for longitudinal reciprocable movement is cooperatively positioned with respect to a horizontal tool spindle 15 journalled in an axially slidable spindle quill 17 mounted in the spindle head 13. A power operable feed and rapid traverse drive mechanism (not shown) is connected to effect selective longitudinal movement of the worktable 14 relative to the rotatable cutter spindle 15 for performing a machining operation. As shown in Fig. 1, for example, a cutter 18 mounted in the spindle 15 is shown in retracted position after completing a milling operation on the vertical side face of a workpiece 19 secured to the table 14. The power drive mechanism for initiating and effecting selective worktable movement is similar to the arrangement that is fully shown and described in copending U.S. patent application, Serial No. 607,948, filed September 6, 1956, by Frank Zankl and John G. Osburn.

The vertically movable spindle head 13 is provided with a housing 21 having in its front wall an opening carrying a clamping sleeve, and rearwardly thereof an integrally formed bearing 22. An antifriction bearing 23, mounted in a smaller concentrically formed bored opening formed in the rear wall of the housing 21 is disposed to support the rearwardly extending end of the tool spindle 15 for both rotatable and axial movement. The forward portion of the tool spindle is rotatably journalled within the quill 17 by spaced apart bearings 25 and 26, Fig. 1. Thus, the supporting quill 17 and tool spindle 15 constitute a unitary assembly that is supported for bodily axial movement within the housing 21 in the bearings 22 and 23.

Power for driving the tool spindle 15 at a selected speed rate is transmitted to rotate either a high speed gear 27 or a low speed gear 28, both of which are keyed to the central portion of the tool spindle. The spindle driving gears 27 and 28 are secured to the tool spindle for both rotatable and axial movement therewith. A cooperating shiftable range change cluster gear 29 is slidably keyed to a primary shaft 30 journalled at its opposite ends in the spaced apart front and rear walls of the housing 21. By means of a combined shifting and compensating mechanism (not shown), the cluster gear 29 is caused to be moved axially along the shaft 30 in accordance with the axially adjusted position of the quill 17 and spindle 15. Thus, irrespective of the axial position of the quill 17, the cluster gear 29 may be shifted into, and maintained in engagement with one or another of the spindle gears 27 or 28. The cluster gear 29 is provided with a gear 32 that is continuously engaged with an elongated driving pinion 33 rotatably journalled within the housing irrespective of the position of the cluster 29 along the shaft 30. Power for driving the pinion 33 is derived from a variable speed transmission (not hown) that in turn is connected to receive input driving power from a motor 34, Fig. 6.

For effecting axial movement of the spindle 15, a longitudinally extending rack 36 secured to the quill 17 is engaged by a rotatable pinion 37. The pinion 37 is fixedly secured to a rotatable shaft 38 journalled within the head and having affixed to its upper end a worm wheel 41. As shown in Figs. 1 and 3, the worm wheel 41 is engaged by a horizontal worm 42 that is carried for both rotatable and axial movement by means of a concentrically rotatable and axially movable adjusting sleeve 43. At its inner end, the worm 42 is provided with a circular pilot journalled in a sleeve bearing 44. Toward its forward end, the worm 42 is provided with an integrally formed shaft 46 rotatably supported by a tubular bearing 47 within a bored opening formed in the adjusting sleeve 43. The adjusting sleeve 43, in turn, is journalled for rotatable and axial movement in a sleeve bearing 48 fixedly supported by a side wall of the housing 21. A pair of spaced apart thrust bearings 49 and 50 are maintained in abutting engagement with shoulders formed on the adjusting sleeve 43 by means of a clamp nut 52, thus retaining the worm in fixed axial relationship to its supporting sleeve 43.

To effect axial movement of the sleeve 43 whenever it is rotated, a helical cam groove 53 formed in the periphery thereof is engaged by a stationary, radially extending guide pin 54 fixedly secured within the spindle head 21 against bodily movement relative thereto. Normally, the worm 42 is restrained against rotation relative to the supporting adjusting sleeve 43 by means of a releasable clutch or clamp mechanism 57. Thus, rotation of the adjusting sleeve 43 relative to the guide pin 54 effects both a rotatable and axial movement of the worm 42 to rotate the worm wheel 41, and thereby effect axial retracting or repositioning movement of the spindle quill 17.

For moving the spindle quill axially to a preset position of adjustment, the serrated clutch mechanism 57 is releasable to permit independent manual rotation of the worm 42 relative to the sleeve 43. To effect this result, the sleeve 43 is provided with an outwardly projecting integrally formed circular end portion 58 having internal serrations disposed to engage complementary serrations in a circular locking member 59 mounted on the worm shaft for inward axial movement. The internal serrations presented by the sleeve end portion 58 coact with the peripheral serrations presented by the axially movable, circular locking member 59 to constitute the releasable serrated clutch mechanism 57 for effecting selective angular adjustment of the worm 42 relative to the sleeve 43 and end portion 58. The hub of the locking member 59 is fastened by a pin 60 extending through an elongated diametral slot 61 in the worm shaft 46, to be moved by an axially movable plunger 64 slidably mounted in a bored opening 65. Normally, a spring 66 operates to bias the plunger 64 outwardly to retain the serrated locking member 59 in fixed engagement with the serrated sleeve end portion 58. Insertion of the pilot end of a handcrank (not shown) in the bored opening 65 depresses the plunger 64 to disengage the circular clamp member 59, and permits the crank to engage clutch teeth for rotating the worm 42 relative to the sleeve 43.

For rotating the adjusting sleeve 43 to move the worm 42, a pinion 67 fixedly secured thereto is engaged by rack teeth 68 formed on one side of a piston 69 slidably mounted in a cooperating hydraulic cylinder 70. With the piston 69 moved to its extreme lower limit of movement in the cylinder 70, as shown in Fig. 2, the sleeve 43 is positioned to retain the quill 17 in an outer preset position, as determined by manual rotation of the worm 42 relative to the sleeve 43. Conversely, with the piston 69 moved to its upward or opposite limit of movement in the cylinder 70, the sleeve 43 is rotated to effect a slight retracting movement of the quill 17 relative to its preset position.

During automatic retracting or repositioning movement, the piston 69 is adapted to move a much greater distance within the cylinder 70 than the quill 17 within the spindle head. The gearing interconnected between the piston 69 and the quill 17 provides approximately an eight to one reduction. For example, assuming the piston 69 has a two inch range of movement within the cylinder 70, the quill will be retracted one-fourth of an inch. This reduction increases the accuracy of quill movement in response to piston movement. Actually, the piston is retained in either of its end positions within the cylinder 70 to constitute a gear connected positive stop for precisely terminating automatic quill movement in either direction.

By means of the arrangement hereinbefore described, it will be apparent that the spindle 15 may be automatically retracted or returned to its preset position irrespective of the selected preset position effected by the manual adjustment of the worm 42 relative to the sleeve 43. The releasable worm clamping mechanism 57 and the relative rotation between the worm 42 and sleeve 43 constitute a primary positioning mechanism for initially adjusting the quill and spindle to a preset position for effecting a particular milling operation. Usually, this manual adjustment is effected when the piston 69, Fig. 2, is in its lower position for retaining the quill 17 in its outer or non-retracted position. This is due to the fact that the cutter engages the workpiece in effecting a milling operation when the quill is in its non-retracted position.

After the quill 17 is moved axially to a selected preset position, the hydraulically actuated piston 69 is operative to effect a secondary positioning or retracting movement of the quill in coordinated relationship with movement of the worktable 14. For example, as shown in Fig. 6, the spindle 15 is retained in its outer preset position as the table 14 is moved rightwardly for moving the workpiece 19 into engagement with the cutter 18. At the completion of the milling operation and rightward table movement, the spindle 15 is retracted slightly, as shown in Fig. 1, in a manner that the cutter 18 clears the finished surface of the workpiece 19 upon reverse movement of the worktable 14 to its starting position.

Whenever the tool spindle 15 is moved outwardly to its non-retracted preset position, an automatic quill clamping mechanism 73, Figs. 1 and 2, is adapted to clamp the quill 17 against axial movement. The quill clamping mechanism 73 is actuated to unclamped position upon upward movement of the piston 69 to effect retracting movement of the tool spindle 15. Manual means including a lever 74, Fig. 6, are operative to unclamp the quill 17 when in its preset position for effecting manual positioning movement thereof to a different preset position of axial adjustment.

The mechanism 73 for clamping and unclamping the quill includes a contractible clamp ring or sleeve 75, Fig. 2, encircling the forward end of the quill 17. Toward its lower central portion, the clamp ring 75 is provided with a radial slot 76, together with spaced apart vertical abutments on either side of the slot. A movable clamp element 79, secured to the inner end of a non-rotatable clamp rod 80 engages one of the abutments. The other abutment is engaged by the inner end of a tubular clamp element 81 encircling the rod 80. At its outer end, the tubular clamp element 81 is seated against one race of a thrust bearing 82. The other race of the thrust bearing in turn abuts the inner face of a rotatable nut 85 threadedly engaging the outer end of the clamp rod 80. The nut 85 is provided with an outwardly extending clutch tongue 86 engaging the slotted inner end of an adjusting element 87. A set screw 88 engages an annular groove in the adjusting element 87 to retain the serrated inner end thereof in engagement with the serrated bore in a bell crank 89. The bell crank 89 is provided with a radially extending arm 90 engaged at its upper end by a vertical slot formed in an axially movable piston rod 91, Fig. 4, extending through a suitable opening provided toward one end of a hydraulic clamp cylinder 92. At its inner end, the rod 91 is secured to a piston 93 carried for axial movement in the cylinder 92.

For contracting the clamp ring 75 into clamping engagement with the quill 17, hydraulic fluid under pressure is admitted through a supply line 95 in a manner to urge the piston rightwardly, as viewed in Fig. 4. Movement of the piston 93 effects a corresponding movement of the piston rod 91 for rotating the bell crank 89 in a clockwise direction. As the bell crank 89 is rotated, the clamp elements 79 and 81 are urged toward each other to exert clamping pressure for contracting the clamping ring 75. To unclamp the quill 17, the line 95 is connected to exhaust, and pressure fluid is supplied through a supply line 96 to move the piston 93 in the opposite or unclamping direction.

The degree of quill clamping pressure exerted by the clamp elements 79 and 81 may be selectively varied by repositioning the clamp adjusting element 87 relative to the bell crank 90. To accomplish this, the set screw 88 is first withdrawn from engagement with the annular groove in the adjusting element 87. The adjusting element 87 is then moved outwardly a distance sufficient to disengage the serrated inner end from the bell crank 89, but in a manner to retain the slot in engagement with the clamp rod tongue 86. It will be apparent that the adjusting element 87 may then be rotated to rotate the clamp rod 80 the required distance relative to the bell crank 89 for repositioning the clamp elements 79 and 81. The adjusting element 87 is again moved inwardly to retain the clamp rod in the required degree of rotatable adjustment relative to the bell crank for obtaining the proper degree of clamping pressure when the clamp ring 75 is contracted.

To effect automatic retracting or repositioning movement of the tool spindle 15, as well as automatic clamping of the quill 17, there is provided an electro-hydraulic control system as schematically shown in Fig. 6. Hydraulic fluid for effecting quill movement is withdrawn from a sump 97 by a pump 98 connected to be driven by the spindle motor 34. From the pump 98, fluid under pressure flows through a main supply line 99 in which uniform pressure is maintained by a pressure regulating valve 101. The supply line 99 is connected to supply fluid under pressure to an inlet port in the tubular valve body 102 of a quill directional or retracting valve 103. With a solenoid 104 of the valve energized, a tubular valve spool 105 is moved leftwardly in the valve body 102 as shown. The flow of pressure fluid then continues from the line 99, about a cannelure 106 of the valve spool to a line 107 connected at its opposite end directly to an inlet port in the quill moving cylinder 70.

Admission of pressure fluid to the cylinder 70 from the line 107 effects downward movement of the piston 69 for returning the quill 17 together with the spindle 15 to its manually preset position. Upon arrival of the quill 17 in its preset position, the flow of pressure fluid continues via an uncovered port to a line 110. At its opposite end, the line 110 is connected to an inlet port in a tubular valve body 111 of a manual release valve. With the manual release lever 74 moved rightwardly, as shown in Fig. 6, a valve spool 112 is likewise moved rightwardly to effect automatic operation of the quill clamp mechanism. The flow of fluid continues from the line 110, about a cannelure 114 in the valve spool to the line 95. The line 95 is connected to supply pressure fluid to an inlet port in the quill clamp cylinder 92 for effecting rightward, clamp actuating movement of the piston 93. With the quill returned to preset position and clamped as described, the line 96 is connected to exhaust via the release valve to a line 115, and thence via the directional valve 103 to a return line 116. Fluid is also exhausted from the cylinder 70 via a line 117 connected to the line 115.

For effecting manual readjustment of the quill to a different preset position, it is necessary to unclamp the quill while in its non-retracted position. To unclamp the quill 17, the manual control lever 74 is moved inwardly to effect leftward movement of the valve spool 112. Leftward movement of the valve spool 112 effects a transmission of pressure fluid from the line 110, about a cannelure 119 to the line 96, thus effecting leftward or unclamping movement of the piston 93. The other line 95 from the clamp cylinder 92 is then connected to exhaust via the cannelure 114 of the valve spool 112 to the line 115. With the lever 74 moved leftwardly to unclamp the quill, it will be noted that the pressure fluid from the line 107 is still operative to urge the piston 69 downwardly for retaining the quill in its non-retracted position.

After the quill 17 has been moved to a different preset position, energizing a solenoid 120 of the quill directional valve 103 effects rightward movement of the valve spool 105 for moving the spindle quill 17 to its retracted position. Rightward movement of the valve spool 105 provides a flow of pressure fluid from the supply line 99, about a cannelure 121, to the line 115. From the line 115, a branch line 122 connected to one end of the release valve body 111 supplies pressure fluid for effecting rightward movement of the valve spool 112 and manual lever 74, from manual release to automatic position as shown. The flow of pressure fluid continues from the lines 115 and 122, through the leftward end of the valve body 111 to the line 96 for supplying pressure fluid for retaining the piston 93 in leftward unclamped position. At the same time, pressure fluid from the line 115 flows through the line 117 that is now operative to effect upward or retracting movement of the quill moving piston 69, Figs. 2 and 6. Exhaust fluid flows from the opposite side of the piston 69 via the line 107, about the cannelure 106 of the directional valve spool 105 to the exhaust line 116. Likewise, fluid is exhausted from the clamp cylinder 92 via the line 95 about the cannelure 114 of the valve spool 112, and thence through the line 110, and a check valve 124 to the line 107, connected to exhaust. The described condition illustrates the return of the valve spool 112 to rightward automatic position upon energizing the directional valve solenoid to effect retracting movement of the quill 17. With the valve spool 112 moved rightwardly, automatic clamping and unclamping action is resumed in accordance with quill movement.

It will be apparent that the solenoids 104 and 120 may be connected for push button controlled operation (not shown) to actuate the hydraulic control system for effecting sequential unclamping and retracting movement of the spindle quill 17. In the preferred embodiment shown in Fig. 6, however, there is provided a fragmentary showing of an electrical control circuit for effecting program controlled operation of the retractible spindle quill 17 in coordinated relationship with movement of the worktable 14. As fully explained in the aforementioned copending patent application, the complete program control system there disclosed is so arranged that the arrival of a moving machine element at a predetermined position operates both to terminate that movement and to initiate the next selected machine movement or function.

Referring to Fig. 6, the fragmentary electrical circuit is connected to a three phase source of supply current for energizing line conductors $L_1$, $L_2$ and $L_3$. The control circuit, represented by light lines in the drawing, receives current of reduced voltage from one winding of a transformer 127. Depressing a start button switch 128 effects a flow of current from an energized conductor 129, a normally closed stop button switch 130 to a conductor 131. Current flow continues from the conductor 131 to energize the coil of a relay 133 and is completed to the energized conductor 134. A holding circuit for retaining the relay 133 in energized closed position is completed through the closed upper contact bar of the relay to a conductor 135, normally connected via the closed stop switch 130 to the energized conductor 129. Movement of the starting relay 133 to closed position in turn effects energization of a program control relay 136 and a motor starting relay 137. Closure of the lower contact bar of the relay 133 completes a circuit from the energized conductor 135, to a conductor 140, and through the coil of the motor starting relay 137 to the energized conductor 134. Upon movement of the relay 137 to energized closed position, a power supply circuit is completed from line conductors $L_1$, $L_2$ and $L_3$ to conductors 141, 142 and 143 connected to energize the spindle drive motor 34.

In a similar manner, a holding circuit is established from the conductor 135, the closed middle bar of the relay 133, to a conductor 144, the coil of the relay 136, to the energized conductor 134. Movement of the relay 136 to closed position completes a circuit from the energized conductors 134 and 135, via the closed contact bars of the relay 136, and the conductors 146 and 147 connected to energize the program control system 148. The program control system 148 is connected via conductors 150, 151 and 152, 153 to function change switches 154 and 155 respectively. In a similar manner, the program control system 148 is connected via conductors 157, 158 and 160, 161 to function change switches 163 and 164 respectively positioned at the opposite ends of the quill moving cylinder 70. For effecting selective operation of the quill retracting valve 103, the solenoids 104 and 120 are respectively connected via conductors 165, 166 and 167, 168 to the program control system.

In operating the machine, the spindle 15 is moved outwardly and clamped in a manner that the cutter 18 is positioned to engage a workpiece 19 for performing a cutting operation. Table movement in a rightward direction is then initiated by starting the table drive mechanism (not shown). Table movement continues in a rightward direction until the workpiece 19 passes the cutter 18, and an adjustable dog 170 secured to the table 14 actuates the function change switch 154 to closed position. Closure of the function change switch 154 actuates the program control system 148 to stop rightward movement of the worktable 14. At the same time, the program control system 148 energizes the conductors 167, 168 to energize the solenoid 120 for both unclamping the quill 17 and effecting retracting movement thereof as hereinbefore explained. Upward movement of the quill retracting piston 69 continues until a plunger rod 172 secured thereto actuates the function change switch 164 to open position. Opening of the switch 164 actuates the program control system 148 to energize conductors (not shown) to immediately initiate leftward movement of the worktable to its starting position. During leftward table movement, however, the hydraulic pressure continues from the line 117 to maintain the piston 69 in its uppermost position. Thus, the cutter 18 is retracted a sufficient distance to completely clear the finished surface of the workpiece 18 upon return worktable movement.

Leftward movement of the worktable 14 to starting position is terminated as soon as an adjustable dog 171 secured to the table actuates the function change switch 155 to closed position. Closure of the switch 155 activates the program control system 148 both to terminate leftward table movement, and to energize the solenoid 104 for moving the valve spool 105 leftwardly. Leftward movement of valve spool 105, as hereinabove explained, effects a flow of pressure fluid to urge the piston 69 to its lowermost position, and urge the piston 93 rightwardly to clamp actuating position. Pressure fluid from the line 107 continues to urge the piston 69 downwardly after a plunger 173 secured thereto actuates the switch 163 to open position. In single cycle operation, movement of the function change switch 163 to open position actuates the program control system 148 to terminate both quill movement and worktable movement. Thus, the quill 17 is clamped in its non-retracted, preset position, and the worktable 14 is in its leftward position for starting another machining operation.

In a modified form of the invention, provision is made for selectively adjusting the extent of quill retracting movement. To accomplish this, as shown in Fig. 5, a hydraulic cylinder 175 is operatively interconnected in the electro-hydraulic control circuit, Fig. 6, in a manner similar to the cylinder 70, Figs. 2 and 6. As shown in Fig. 5, a piston 176 is slidably carried within the cylinder 175, and is limited in its downward movement by the inner end of the cylinder for maintaining the quill 17 in its non-retracted, manually preset position. Pressure fluid from the line 107 is operative to effect downward movement of the piston, a rod 177 secured to the lower end thereof being operative to actuate the function change switch 163 for terminating outward quill movement, as hereinbefore explained, and for initiating the next function. Hydraulic pressure fluid from the line 117 effects upward, or quill retracting movement of the piston 176. The extent of quill retraction is determined by a positive stop 178 that is selectively positionable in a longitudinal bore formed in the piston 176. Engagement of the piston 176 with the adjustable positive stop 178 effects upward movement of a threaded rod 179, as well as a rotatable and axially movable adjusting member 180, to actuate the function change switch 164 to open position, thus terminating retracting movement of the quill.

The positive stop 178 is provided with radial extensions engaging longitudinal grooves 182 in the bore of the piston 176 to restrain the adjusting screw 179 against rotation. The screw 179 has threaded engagement with the rotatable adjusting member 180, which in turn is connected to be rotated by an adjusting knob 183. A tongue and slot connection between the adjusting knob 183 and the adjusting member 180 permits a slight axial movement of the latter for activating the switch 164. Rotation of the knob 183 rotates the adjusting member 180 for effecting axial movement of the positive stop 178 to selectively control the extent of retraction of the spindle quill 17.

From the foregoing description of the improved spindle positioning and retracting mechanism, it will be apparent that there has been provided an improved control mechanism for effecting selective axial positioning movement of a machine tool spindle. The mechanism incorporates automatic means for retracting the tool spindle a predetermined amount irrespective of the axially preset position to which it has been manually adjusted. Likewise, the mechanism is adapted to return the spindle quill to its manually preset position. Retracting and return movement of the spindle quill are effected automatically and in coordinated relationship with worktable movement in a manner to preclude damaging the finished surface of a workpiece upon return movement of the worktable to its starting position.

Although the illustrative embodiments of the invention have been described in considerable detail for the purpose of setting forth an operative and practical exemplifying structure, it is to be understood that the structure and control system shown and described are intended to be illustrative only and that various characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool, a frame, a spindle quill carried by said frame for axial movement in either direction, a rotatable worm wheel journalled in said frame connected to move said quill, a rotatably journalled worm connected to meshingly engage said worm wheel, a concentrically rotatable sleeve journalled in said frame operatively disposed to rotatably support said worm, said sleeve being carried for axial movement and having formed in its periphery a helical cam groove, a stationary pin secured to said frame and disposed to extend radially inward to engage the cam groove formed in said sleeve, a manual adjustment mechanism connected to rotate said worm and lock it in a predetermined position of rotatable adjustment relative to said sleeve, and an automatic adjustment mechanism connected to rotate said sleeve to a predetermined fixed position, said automatic adjustment mechanism being operative when actuated to effect both a rotatable and axial movement of said sleeve relative to said pin for moving said worm to effect a predetermined degree of quill movement.

2. In a milling machine, a frame, a spindle head slidably carried by said frame for vertical movement, a spindle quill slidably carried by said head for axial movement, a power driven tool spindle journalled in said quill for axial movement therewith, a worktable slidably carried by said frame in cooperative relationship to said tool spindle, a longitudinally extending rack secured to said quill, a common shaft transversely journalled in said head including a pinion secured thereto engaging said rack, a worm wheel secured to said shaft, a worm carried for both axial and rotatable movement connected to engage said worm wheel, a concentric sleeve disposed to rotatably support said worm and being movably supported in said head for rotatable and axial movement, said sleeve being provided on its periphery with a helical cam groove, a stationary pin secured to said head extending radially inward to engage the cam groove in said sleeve, a releasable latch including manual adjusting means operative to permit a predetermined rotatable adjustment of said worm relative to said sleeve for moving said quill axially to a preset position of manual adjustment, an axially slidable piston connected to rotate said sleeve relative to said pin a limited amount for effecting a combined rotary and axial movement of said worm to move said quill relative to its preset position, a hydraulic cylinder adapted to slidably support said piston for axial movement to one or another of two extreme end positions therein, said piston being movable to one end position for retracting said quill relative to its preset position, said piston being movable to its opposite end position for returning said quill to its preset position, and a hydraulic control circuit including a source of hydraulic fluid under pressure connected to move said piston to one or the other of its end positions in said cylinder for selectively moving said quill relative to its preset position.

3. In a machine tool, an axially movable spindle quill carrying a longitudinally extending rack, a pinion secured to a rotatable shaft connected to engage said rack, a worm wheel secured to said shaft, a worm disposed to engage said worm wheel and being carried for both axial and rotatable movement, a concentrically journalled adjusting sleeve disposed to rotatably support said worm, disengageable clutch means operative to lock said worm in a predetermined degree of rotatable adjustment relative to said sleeve, said adjusting sleeve being guided for axial movement and being provided on its periphery with gear teeth and a cam groove, a stationary radial pin extending inwardly to engage the cam groove in said sleeve, a transversely positioned axially slidable piston provided with rack teeth disposed to engage the gear teeth presented by said sleeve, a cylinder disposed to slidably support said piston for axially slidable movement in either direction, and hydraulic control means connected to move said piston axially to its extent of movement in either direction for rotating said sleeve, said sleeve being operative when rotated to effect both rotatable and axial movement of said worm to thereby effect axial movement of said spindle quill.

4. In a machine tool, an axially movable spindle quill carrying a longitudinally extending rack, a pinion secured to a rotatably journalled shaft and being connected to engage said rack, a worm wheel secured to said shaft in spaced relationship to said pinion, a rotatable and axially movable worm connected to meshingly engage said worm wheel, a concentrically journalled adjusting sleeve disposed to rotatably support said worm and being provided on its periphery with a cam groove, a stationary radial pin extending inwardly to engage the cam groove in said sleeve, a releasable clutch mechanism operative to retain said worm in a predetermined position of rotatable adjustment relative to said supporting sleeve for effecting selective manual axial adjustment of said quill, a transversely positioned axially movable piston connected to rotate said sleeve relative to said radial pin for effecting retracting and repositioning movement of said quill relative to its manually adjusted position, said sleeve being operative when rotated to effect both axial and rotatable movement of said worm, a cylinder disposed to support said piston for axial movement, adjusting means operatively associated with said cylinder for limiting the extent of piston movement, and hydraulic means operatively connected to said cylinder for moving said piston to either of two extreme limits of movement within said cylinder, said piston thereby being operable to selectively and adjustably limit the extent of rotation of said sleeve for limiting the retracting movement of said quill.

5. In a milling machine, a column, a spindle quill mounted in said column for axial slidable movement, a gear connected to effect selective axial movement of said spindle quill, a manual adjustment mechanism connected to selectively rotate said gear for moving said spindle quill to a selected position of axial adjustment relative to said column, a retracting mechanism connected to rotate said gear for retracting said spindle quill a predetermined distance from the position of axial adjustment determined by said manual adjustment mechanism, said retracting mechanism connected to be actuated for returning said spindle quill to the position of axial adjustment originally effected by said manual adjustment mechanism, and adjusting means connected to selectively vary the extent of movement of said retracting mechanism for varying the extent of retracting movement of said quill whereby said quill is manually movable to a preset position, and whereby said quill is retractable to a selectively preset retracted position.

6. In a combined positioning and retracting mechanism for the axially movable spindle quill of a milling machine, a rotatable member connected to effect axial movement of said spindle quill, a concentrically rotatable sleeve presenting on its periphery a helical cam groove and arranged to rotatably support said member for independent or concomitant rotation, guide means engaged with the cam groove in said sleeve and adapted upon rotation of said sleeve to effect axial movement thereof and a corresponding axial movement of said member, an adjustable locking device operable to lock said member in a predetermined position of rotatable adjustment relative to said sleeve, and an automatic control system connected to rotate said sleeve a predetermined amount, whereby said quill is axially movable either in response to said adjustable locking device or said control system.

7. In a spindle retracting and positioning mechanism for a machine tool, a spindle carrying quill carried for axial movement, a worm carried for rotary and axial movement connected to effect axial movement of said quill, a concentric sleeve adapted to rotably support said worm and being in turn carried for rotatable and axial movement, said sleeve being provided in its periphery with a helical cam groove, a stationary pin extending radially inward to engage the cam groove in said sleeve for axial movement of said sleeve upon rotation thereof, a releasable latch operative to clamp said worm in a predetermined position of rotatable adjustment within said sleeve for moving said quill to a manually effected preset position, a piston connected to rotate said sleeve, a cylinder adapted to slidably support said position for axial movement, said piston being movable to one end position in said cylinder for retracting said quill, said piston being movable to the opposite end position for returning said quill from retracted to preset position, an automatically releasable clamp operative to clamp said quill in its preset position, said clamp being actuated to unclamped position by actuation of said piston to effect retracting movement of said quill, said clamp being actuated to clamped position after said quill is returned to preset position by operation of said piston, and a separate manual release mechanism normally positioned to condition said clamp for automatic or manual clamping of said quill each time it is returned to its preset position, said release mechanism being manually positionable to effect unclamping movement of said clamp when said quill is in its preset position in order that said worm may be manually rotated to move said quill to a different preset position of adjustment, said release mechanism being operatively connected to be automatically returned to its normal position for conditioning said clamp for automatic operation in response to a subsequent retracting operation of said piston, whereby said clamp mechanism is rendered automatically operative to be moved to clamped or unclamped position in accordance with hydraulically actuated movement of said piston.

8. In a machine tool, a frame, a quill slidably carried by said frame for axial movement, a power driven tool spindle journalled in said frame, manual adjusting means comprising a first rotatable shaft connected to move said quill axially to a preset position, automatic retracting means connected to move said quill relative to its preset position comprising a concentrically journalled sleeve adapted to rotatably support said shaft, a disengageable clutch mechanism operatively connected between said shaft and said sleeve, said sleeve being carried by said frame for rotatable and axial movement, said sleeve being provided with a helical cam groove, a cam engaging pin carried by said frame to engage the groove in said sleeve for axial movement of said sleeve upon rotation thereof, an automatic clamp mechanism operative to clamp said quill in its forward preset position, an automatic control system connectable to sequentially release said clamp and rotate said sleeve for retracting said quill, said control system being sequentially operative to rotate said sleeve for returning said quill to preset position and to reengage said clamp, and an independent selector interconnected in said control system being manually actuatable from an automatic position in which said control system is conditioned for automatic clamping to a position for releasing said clamp whenever said quill is in preset position, said selector being connected to be automatically returned to its automatic position upon subsequent operation of said control system to retract said quill.

9. In a machine tool, a frame, a quill carried by said frame for axial movement, a tubular control sleeve journalled in said frame and presenting on its periphery a helical cam groove, a pin secured to said frame disposed to engage the cam groove presented by said sleeve, a worm shaft journalled in said sleeve and operatively connected to effect axial movement of said quill, a disengageable clutch mechanism positively interconnected between said tubular sleeve and said worm shaft, said clutch mechanism being disengageable for effecting manual rotation of said worm shaft relative to said sleeve for moving said quill to a selected forward preset position, a first hydraulically actuated piston including a cooperating cylinder connected to rotate said sleeve relative to said pin for effecting a corresponding rotatable and axial movement of said worm shaft for retracting said quill from its forward preset position, said piston being reversibly operable to return said quill from retracted to preset position, a clamp mechanism operable to clamp said quill in its forward preset position, a second hydraulically actuated piston including an associated cylinder connected to actuate said quill clamp mechanism, a hydraulic control system including a source of pressure fluid and a control valve operatively connectable to sequentially actuate said second piston for actuating said clamp mechanism to unclamp said quill and actuate said first piston for retracting said quill, said hydraulic system and said control valve being actuatable to sequentially actuate said first piston to return said quill from retracted to preset position and to actuate said second piston for actuating said clamp mechanism to reclamp said quill, and a selector valve interconnected in said control system being movable from a position for effecting automatic clamping to a position for disengaging said clamp to permit manual adjustment of said worm when said quill is in a forward preset position, said selector valve being connected to be automatically returned to its automatic clamp actuating position upon actuation of said control valve and said hydraulic system to effect subsequent retraction of said quill.

References Cited in the file of this patent

UNITED STATES PATENTS

| | | |
|---|---|---|
| 2,445,433 | Holmstrom | July 20, 1948 |
| 2,615,372 | Coffin | Oct. 28, 1952 |
| 2,633,061 | Roehm et al. | Mar. 31, 1953 |